Figure 1:
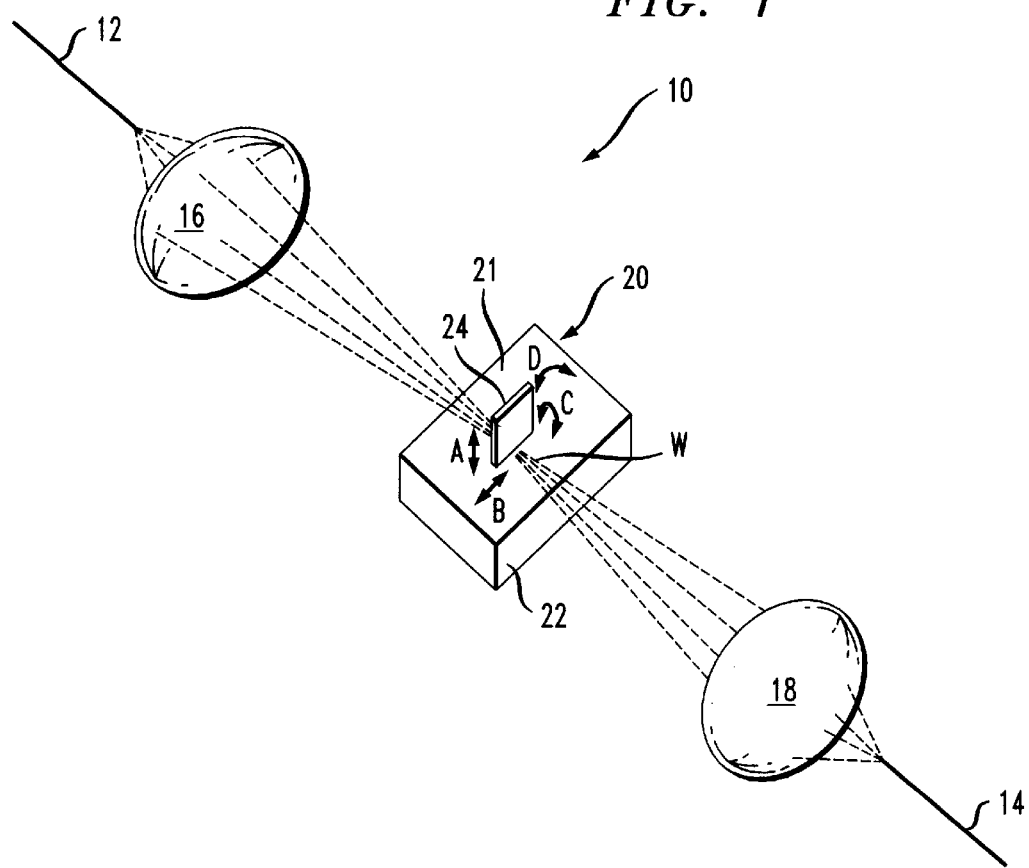

United States Patent
Bergmann et al.

[11] Patent Number: 6,163,643
[45] Date of Patent: Dec. 19, 2000

[54] MICRO-MECHANICAL VARIABLE OPTICAL ATTENUATOR

[75] Inventors: Ernest Eisenhardt Bergmann, Borough of Fountain Hill, Pa.; David John Bishop, Summit, N.J.

[73] Assignee: Lucent Technologies Inc., Murray Hill, N.J.

[21] Appl. No.: 09/133,278

[22] Filed: Aug. 12, 1998

[51] Int. Cl.[7] .................................................. G02B 6/35
[52] U.S. Cl. ........................ 385/140; 385/134; 385/73; 385/74; 385/75; 385/16; 385/18; 359/227; 359/230; 359/434
[58] Field of Search ............................. 385/140, 74, 75, 385/55, 56, 73, 16, 18; 359/434, 435, 227, 230–233

[56] References Cited

U.S. PATENT DOCUMENTS

| | | | |
|---|---|---|---|
| 4,213,677 | 7/1980 | Sugimoto et al. | 385/74 |
| 4,563,057 | 1/1986 | Ludman et al. | 359/210 |
| 4,591,231 | 5/1986 | Kaiser et al. | 385/140 |
| 4,702,549 | 10/1987 | Duck et al. | 385/140 |
| 4,904,044 | 2/1990 | Tamulevich | 385/140 |
| 4,969,720 | 11/1990 | Lins et al. | 350/381 |
| 5,054,866 | 10/1991 | Tomita et al. | 359/201 |
| 5,243,681 | 9/1993 | Bowen et al. | 385/140 |
| 5,311,614 | 5/1994 | Caron et al. | 385/73 |
| 5,318,869 | 6/1994 | Hashimoto et al. | 430/5 |
| 5,345,521 | 9/1994 | McDonald et al. | 385/19 |
| 5,596,445 | 1/1997 | Ishikawa | 385/34 |
| 5,801,807 | 9/1998 | Satake et al. | 351/221 |
| 5,838,847 | 11/1998 | Pan et al. | 385/18 |
| 5,943,454 | 8/1999 | Aksyuk et al. | 385/22 |
| 6,031,946 | 2/2000 | Bergmann et al. | 385/18 |

OTHER PUBLICATIONS

D. Bishop et al., "Optical Micromachined Devices Serve Multiple Applications", Photonics Online, Jan. 27, 1998.

*Primary Examiner*—Rodney Bovernick
*Assistant Examiner*—Ellen E. Kim
*Attorney, Agent, or Firm*—Dilworth & Barrese

[57] ABSTRACT

An electronically variable optical attenuator includes focusing optics that enable the use of a micro-mechanical actuation device with minute movement properties. The actuation device controls the position of a light blocking member relative to the path of a focused light beam to thereby control the attenuation of the light beam.

20 Claims, 3 Drawing Sheets

ATTENUATION
CONTROL
SIGNAL

MICRO-MECHANICAL VARIABLE OPTICAL ATTENUATOR

BACKGROUND OF THE INVENTION

The present invention relates generally to optoelectronics, and more particularly, to variable optical attenuators.

Optical attenuators are employed within fiber optic data transmission systems to reduce optical signal power to within targeted ranges. Variable optical attenuators of several types have been used in the past. One such attenuator utilizes a rotatable disk in between a pair of optical fibers. The disk includes a number of partially opaque windows in different angular regions, each designed to attenuate optical energy by a different amount. Rotation of the disk thus produces step-wise changes in the attenuation characteristic. See, for example, U.S. Pat. No. 4,591,231 to Kaiser et al.

Variable attenuation has also been produced by varying the orientation between a pair of optical fibers. One of the fibers can be maintained in a fixed position while the other fiber is mounted on a movable surface that allows its terminal end to be axially or angularly moved relative to the fixed fiber. Differing attenuation values as a function of the moving fiber's position are thereby achieved due to the imperfect transmission between the fibers.

U.S. Pat. No. 4,904,044 to T. Tamulevich discloses a variable optical attenuator employing a flexible film with an optical density gradient that varies along its length. As the film is displaced across an optical coupling region between two fibers, the attenuation characteristic changes continuously rather than in a step-wise manner.

In recent years, advances have been made in the miniaturization of mechanical actuation devices and in the manufacturing of such miniature devices. In this light, it is desirable to produce a variable optical attenuator including a miniature actuator which is electronically or optically controlled to produce a desired attenuation by appropriately moving an attenuating member. This approach reduces the attenuator size as well as its electrical power consumption.

SUMMARY OF THE DISCLOSURE

The present disclosure is directed towards an electronically variable optical attenuator with focusing optics that enable the use of a micro-mechanical actuation device with minute movement properties. The actuation device controls the depth of penetration of a light blocking member into the path of a focused light beam to thereby control the attenuation of the light beam.

In an illustrative embodiment, the attenuator includes first and second optical ports on opposing ends. A first focusing element receives a light beam originating from an input optical transmission medium and focuses the light beam in a non-collimated manner so as to produce an inverted beam within the attenuator. A second focusing element opposing the first focusing element is operative to substantially focus the inverted beam upon an output optical transmission medium. A movable light blocking member disposed in between the first and second focusing elements selectively attenuates the light beam as a function of position of the blocking member relative to the focused light beam.

BRIEF DESCRIPTION OF THE DRAWINGS

The following detailed description, given by way of example and not intended to limit the present invention solely thereto, will best be appreciated in conjunction with the accompanying drawings in which like reference numerals indicate similar or identical elements, wherein:

FIG. 1 is a perspective view of an embodiment of an optical attenuator in accordance with the invention;

FIG. 2 is a cross-sectional view of the attenuator of FIG. 1;

FIG. 3 is a cross-sectional view of another embodiment of the present invention;

FIG. 4 is a side view of an alternative embodiment of the invention; and

FIGS. 5 and 6 illustrate alternative configurations for light blocking members that can be utilized within attenuators of the invention.

DETAILED DESCRIPTION OF CERTAIN PREFERRED EMBODIMENTS

With reference now to FIG. 1, an exemplary embodiment of a variable optical attenuator in accordance with the invention is shown in a perspective view illustration. As will become apparent hereafter, the optics design of attenuator 10 is particularly tailored to the use of a micro-mechanical actuation device 20 including a thin, movable light blocking member or "flag" 24. Flag 24 produces selective attenuation of an optical beam as a function of its depth of penetration into the beam's path. Attenuator 10 is designed to permit a substantial range of attenuation with only a minute amount of movement by flag 24, e.g., on the order of 20–30 $\mu$m. Hence, an extremely low actuation force can be used to move the flag, such as one based on electrostatics, with essentially negligible electrical power consumption. The movement of flag 24 with respect to the focused beam can be in any of a number of directions such as along the shown A, B, C or D paths, depending on the actuation mechanism of device 20. Flag 24 is shown in FIG. 1 in the path of the light beam corresponding to a maximum attenuation state; it moves outside the beam's path to achieve minimum attenuation.

As shown in FIG. 1, attenuator 10, which is depicted without a package for clarity, includes a pair of axially aligned focusing elements 16 and 18 or opposing sides of the attenuator. Optical transmission media 12 and 14 are disposed in proximity to focusing elements 16 and 18, respectively. (Transmission media 12 and 14 will be referred to hereafter as optical fibers; however, it is understood that other transmission media such as optical waveguides can be used.) Attenuator 10 typically operates as a symmetrical device so that either fiber 12 or 14 can be considered the input or output path, depending on the direction of light propagation. Focusing elements 16 and 18 can each be embodied as (but are not limited to): a double convex lens, plano-convex lens, spherical lens, aspherical lens, gradient index lens or holographic element. In any case, focusing element 16 is designed to receive a light beam emanating from the terminal portion of fiber 12 and focus the same in a non-collimated manner upon a "waist" region W in between focusing elements 16 and 18, typically midway between elements 16, 18. Waist region W corresponds to the minimum cross-sectional area of the focused beam.

The focused beam becomes inverted at waist region W and then begins diverging towards focusing element 18. Focusing element 18 then converges the light energy upon fiber 14. Naturally, if the focusing element 18 optics are designed to focus a light beam emanating from fiber 14 upon waist region W and vice versa, maximum coupling will be realized for the lowest attenuation state (i.e., with flag 24 outside the optical path of the focused beam). It is noted that if fibers 12 and 14 are identical, and focusing elements 16 and 18 are identical and spaced the same distance from the respective fibers 12 and 14, then waist region W is formed midway between elements 16 and 18.

Thus, by forming waist region W in which the cross-sectional area of the focused beam is at a minimum, only a small amount of motion is required by flag 24 to achieve a substantial range of attenuation. For instance, if flag 24 is ideally 100% absorptive or 100% reflective, the amount of movement to go from minimal attenuation to essentially complete attenuation is only slightly more than the cross-sectional diameter of the beam in the region of the flag. Hence, positioning flag 24 directly adjacent to waist W allows for minimum motion requirements of the flag to move from one side of the beam cross-section to the other side and thereby achieve a substantial attenuation range. Merely by way of example, for focusing elements 16 and 18 with clear apertures of at least about 0.5 mm, and focusing element separation in the range of 1–10 mm, a typical cross-sectional area for waist W in practice is about 20–30 $\mu$m.

Accordingly, flag motion of less than about 30 $\mu$m is usually sufficient to provide a large attenuation range for a given flag design. An attenuation range from 0.5 dB (minimum coupling loss) to greater than 50 dB is generally achievable. With such small motion requirements for the flag, actuator 22, which reciprocates flag 24, can be extremely small or "micro-mechanical", meaning that the mechanical motion and the mechanical parts are on the microscopic level. For instance, one of the recently developed silicon micro-electromechanical system (MEMS) chips can be employed for actuator 22. (Actually, flag 24 and actuator 22 are preferably integrated together to form actuation device 20 as a MEMS device). These actuators produce movement by converting an input control voltage to an electrostatics force. MEMS devices are fabricated in much the same way as a silicon VLSI circuit. Various films such as polysilicon, silicon nitride, silicon dioxide, and gold are deposited and patterned to produce complicated, multilayer three dimensional structures. However, the major difference is the release step at the end of the process. In a MEMS device, various layers are etched away using a highly selective etch, leaving a device with movable elements. Examples of MEMS chips are disclosed in co-pending U.S. Provisional Patent Application Ser. No. 60/093323, entitled CHANNELIZED WDM EQUALIZER USING MEMS REFLECTIVE ATTENUATORS, filed Jul. 20, 1998 and assigned to the assignee herein, the subject matter of which is incorporated herein by reference.

One of the many benefits of such a MEMS actuator is its low voltage design: it can produce flag movement to yield appreciable changes in attenuation with as little as one volt applied, with negligible currents. By integrating actuator 22 with a photogenerator that functions as a photovoltaic diode at an optical wavelength, attenuator 10 can be provided as an all-optical light-actuated micromechanical photonic switch that requires no electronics or other sources of energy. Hence, variable attenuator 10 in this case is essentially a device that can switch light with light, using as little as 3 $\mu$W of optical power from a control fiber. Consequently, the advent of attenuator 10 allows for the manufacture of low-cost, reconfigurable, all-optical networks in which both the control lines and the data lines (fibers 12, 14) are optical fibers and the only energy into the system are photons from the central office. This offers service providers the advantages of flexible, real-time control in an adaptable, self-healing network.

With continuing reference to FIG. 1, flag 24 is preferably very thin, e.g. about 1 um thick, with length and width dimensions commensurate with the beam cross-section to be traversed. Flag 24 can be produced as either an absorptive or reflective member. Absorptive designs include neutral density filters and dielectric stacks with alternating layers of different materials. Reflective designs can be single sided—such as a polysilicon layer plated on one side with a reflective metal, e.g. gold—or double sided, such as a thin layer of gold or a polysilicon layer plated on both sides with gold. Whether an absorptive or reflective design is utilized, flag 24 may be patterned symmetrically or asymmetrically to achieve a desired attenuation characteristic as a function of the depth of the flag's penetration into the beam path. Naturally, with a patterned design complete attenuation is not the objective for the maximum attenuation state.

As mentioned above, the reciprocating motion of flag 24 to produce variable attenuation can be in any of a number of directions such as those along paths A, B, C or D. Motion of flag 24 along path A is linear, perpendicular to actuator surface 21 (to which flag 24 is typically coupled). In this case, flag 24 is situated below waist W in the minimum attenuation position. Linear motion can alternatively be along path B, parallel to surface 21, in which case the minimum attenuation position is to the side of waist W in the view of FIG. 1. Flag 24 can also be rotatable such that its motion follows the shape of an arc or see-saw. The arc-like motion can be along path D which is in a plane orthogonal to both surface 21 and to the general beam direction. Alternative arc-like motion along path C is in the plane defined by the beam direction and a vector orthogonal to surface 21. Other motion paths for flag 24 are also possible.

In FIG. 1, while the orientation of the major surface of flag 24 is shown to be orthogonal to the focused beam direction, it can alternatively be tilted with respect to the beam. By tilting the flag, a reduced amount of light energy is reflected back to the transmitting fiber. With the flag appropriately tilted, flag motion can be, e.g., along paths A, B, C or D or in the direction of the tilt. (Note that for path C, the tilt angle with respect to the beam naturally changes along the arc path; however, the flag can still be skewed in the opposite direction such that the flag will be skewed in the maximum attenuation position.) In any case, whether or not the flag is tilted, anti-reflective coating can be provided on the flag's surface to reduce reflections if desired.

It is noted that by placing the tips of fibers 12 and 14 closer to the respective focusing elements 16, 18 or by changing the focusing elements' design, a collimated beam can be generated between the focusing elements. In this case, the beam would not become inverted in between the focusing elements and no waist region W would develop. Since typical lenses 16, 18 for use with fiber optic lines have diameters on the order of about 0.5 mm, the diameter of the collimated beam is also on the order of 0.5 mm. Hence, the motion requirements for flag 24 are substantially greater than for the non-collimated approach disclosed herein. In any event, variable optical attenuators and reflective switches that take the collimated beam approach are disclosed in co-pending U.S. patent application Ser. No. 09/061,437, entitled MOVING MIRROR SWITCH, filed Apr. 16, 1998, by the present inventors, assigned to the assignee herein and incorporated herein by reference.

Another approach that has been attempted is to eliminate lenses 16 and 18 and move the tips of fibers 12, 14 very close to one another. Flag 24, which is positioned in between the fiber tips would then operate to selectively attenuate the light directly emitted from the fibers. This approach is effective in providing variable attenuation but, due to the small gap that needs to be maintained in between the fiber tips, is mechanically more difficult to implement than the focusing element design disclosed herein.

Figure 2:
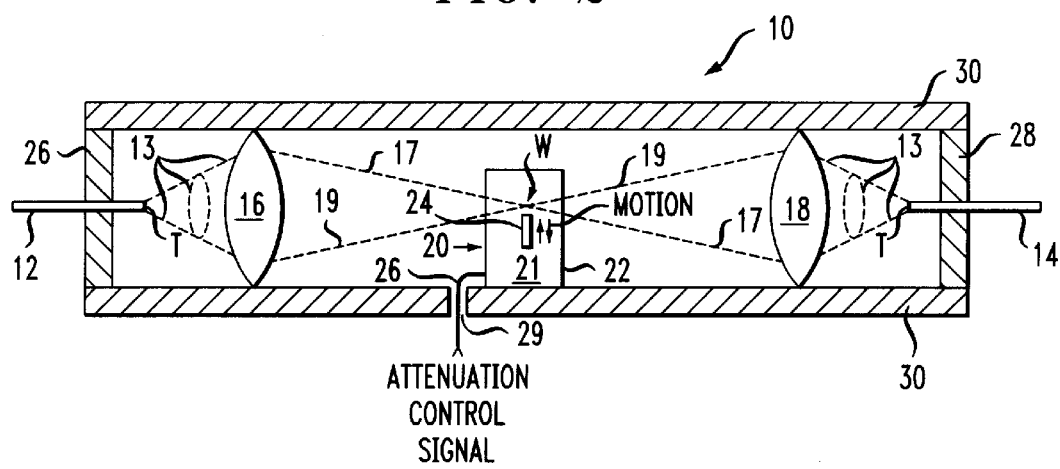

With reference now to FIG. 2, attenuator 10 is depicted in a cross-sectional view, including an illustrative package 30 to retain the various components. A pair of collars 26 and 28 are suitably attached to package 30 and retain fibers 12 and 14, respectively. Each fiber is terminated with a conventional termination T (e.g., cleaved or polished tip) so as to produce a solid conical light beam 13 of generally circular cross section. If optical waveguides are used for transmission media 12 and 14, the beam cross-section may be elliptical. The separation distance between termination T and the respective lens (or holographic element) 16 or 18 is on the order of one millimeter; the fiber core diameters are typically 8 μm. Lens 16 focuses beam 13 upon waist region W such that edge rays 17 and 19 become inverted at region W, with the beam then diverging towards lens 18. In practice, not all of the rays as 17, 19 converge at the same point due to surface tolerances and aberrations of the lenses and also due to diffraction, etc., resulting in a finite beam cross-section at waist region W. The diverging beam is converged by lens 18 (as conical beam 13) upon the termination T of fiber 14. As mentioned earlier, lenses 16 and 18 are preferably of identical design so that in the minimal attenuation state with flag 24 outside the transmitted beam's path, most of the light energy is successfully transmitted between fibers, with coupling loss of about 0.5 dB in practice.

In the embodiment of FIG. 2, flag 24 is positioned directly adjacent to waist W in the minimal attenuation state and traverses waist W in the higher attenuation state or states. (It is noted that the attenuator may be designed to provide only a single high attenuation state if that is all the particular application requires.) The surface 21 of actuator 22 is preferably outside the optical path of the focused beam to avoid perturbing the beam. Depending on the design of actuator 22, the movement of flag 24 may be continuous to provide a continuously variable attenuation, or in discrete steps to yield discrete attenuation values. In the view of FIG. 2, illustrative flag movement in the direction of the arrows shown can be either arc-like (along path D of FIG. 1) or linear (along path B of FIG. 1). The amount of flag motion is in accordance with an attenuation control signal applied to actuator 22 via wire or fiber 26 which traverses aperture 29. A fiber would be used to carry the control signal if a photogenerator functioning as a photovoltaic diode at an optical wavelength is integrated with actuator 22 as mentioned previously.

Figure 3:
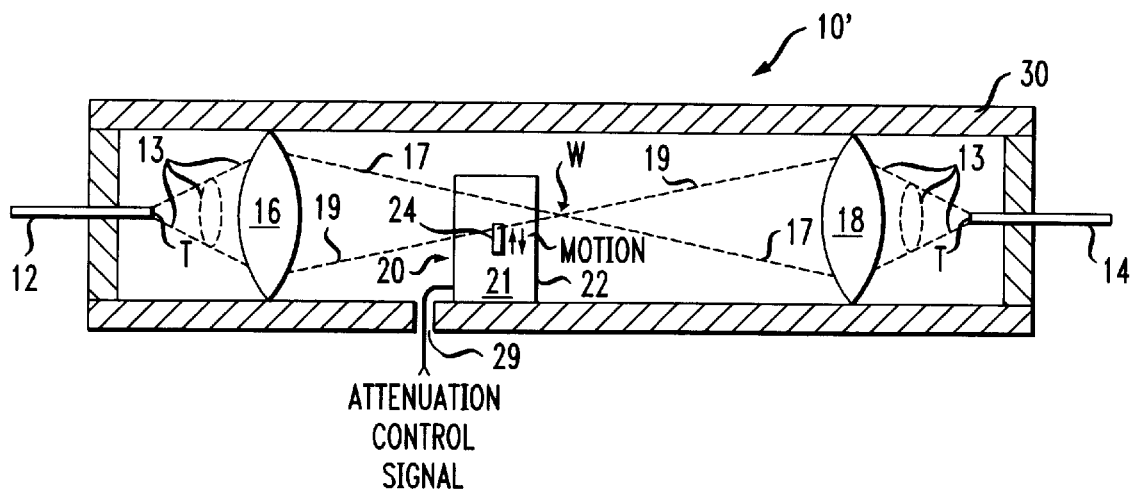

Turning now to FIG. 3, a slightly modified embodiment 10' of a variable optical attenuator is illustrated in a cross-sectional view. The only difference between attenuator 10' and the above-described attenuator 10 is that flag 24 of actuator device 20 is axially offset slightly from waist W towards lens 16. With this approach, the amount of flag motion to move across the cross-section of the beam is, of course, larger. However, assuming actuator 22 can provide the greater motion, the approach affords more gradual attenuation variation as a function of the movement of flag 24. In addition, the approach reduces the optical power density that flag 24 is exposed to.

Figure 4:
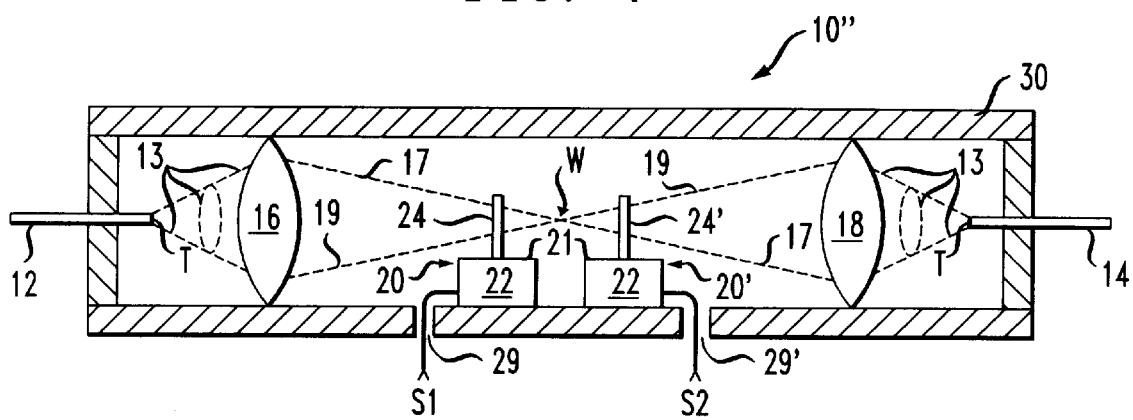

FIG. 4 illustrates still another embodiment of an attenuator, 10", in accordance with the invention in a cross-sectional view. This embodiment is essentially the same as embodiment 10' (albeit shown in an orthogonal cross-section to that shown in FIG. 3) except that an additional micro-mechanical actuation device 20' with flag 24' is incorporated. A pair of attenuation control signals S1 and S2 are applied to the respective devices 20 and 20' to control the overall attenuation. The use of the two flags 24, 24' provides an even more gradual attenuation characteristic with flag motion. The direction of flag motion for the two flags need not be the same; for instance, flag 24 can reciprocate linearly while the motion of flag 24' is arc-like.

Figure 5:
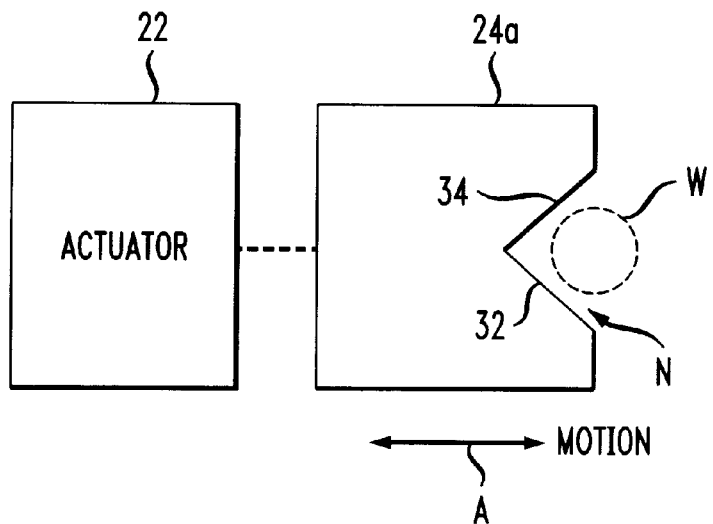

Referring now to FIG. 5, an alternative configuration for the light blocking flag is shown. This flag configuration has been demonstrated to lessen polarization dependent loss (PDL) of the attenuator. Flag 24a is a thin, rectangular member with a notch N provided on one side thereof. The notch is defined by edges 32 and 34 which are oriented at right angles to one another. A cross section of the waist W of the focused light beam of the attenuator is shown relative to flag 24a. Motion of flag 24a is depicted along path A (see FIG. 1) such that the flag segments associated with edges 32 and 34 "slice" equal amounts of the light beam. Alternatively, motion can be along an arc in the plane of the paper (direction D of FIG. 1) if the notch orientation is modified so that the opposing flag segments slice the light beam in a similar manner. With either approach, the attenuation as a function of the flag position is substantially independent of the polarization of the beam. On the other hand, without the notch, the edge(s) of the flag penetrating the beam may cause a polarization dependence to the light's attenuation.

Figure 6:
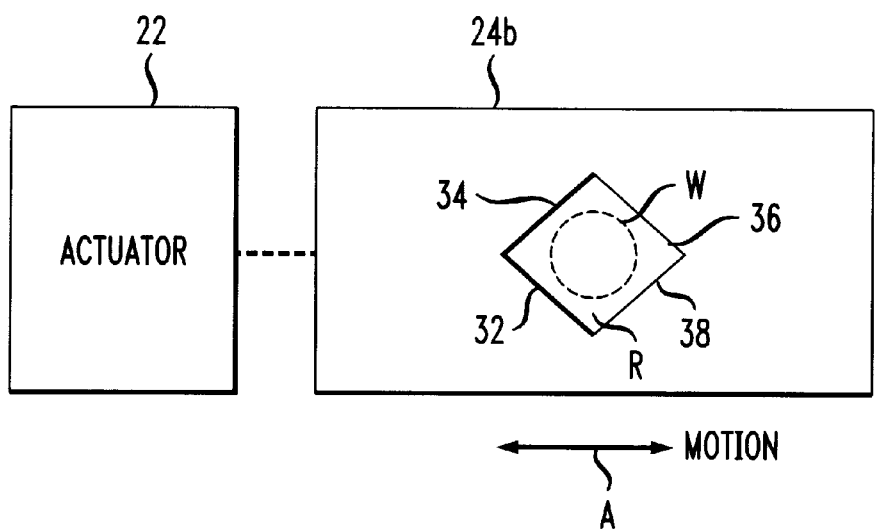

With reference to FIG. 6, another configuration 24b of a flag employable within the attenuators disclosed herein is illustrated. Flag 24b has a diamond shaped aperture R therein defined by edges 32, 34, 36 and 38. Aperture R is large enough for the focused beam with waist W to penetrate with minimal attenuation when aligned properly as illustrated. When the flag is moved, for example, along path A, the edges 32 and 34 or 36 and 38 slice equal amounts of the beam and lessen polarization dependent loss in essentially the same manner as does flag 24a. Motion can alternatively be along an arc in the plane of the paper (direction D) if the aperture is formed as approximately a square rather than the shown diamond. In either case, one advantage of flag 24b is that calibration of the flag position is facilitated: initial attenuation measurements can be performed to ascertain when flag 24b is centrally positioned with respect to the light beam. The minimum attenuation condition corresponds to the centralized flag position.

While the present invention has been described above with reference to specific embodiments thereof, it is understood that one skilled in the art may make many modifications to the disclosed embodiments without departing from the spirit and scope of the invention as defined by the appended claims.

What is claimed is:

1. A variable attenuator, comprising:

a first focusing element for receiving a light beam originating from an input optical transmission medium and focusing said light beam in a non-collimated manner so as to produce an inverted beam within said attenuator;

a second focusing element opposing said first focusing element and operative to substantially focus said inverted beam upon an output optical transmission medium; and a movable light blocking member disposed in between said first and second focusing elements and capable of moving along at least two directional axes for selectively attenuating said light beam as a function of position of said blocking member relative to said focused light beam.

2. The attenuator of claim 1 wherein said focused beam becomes inverted substantially midway between said first and second focusing elements.

3. The attenuator of claim 1 wherein said first and second focusing elements are each selected from the group consisting of a double convex lens, a spherical lens, a plano-convex lens, an aspherical lens, a gradient index lens and a holographic element.

4. The attenuator of claim 1 wherein said focused optical beam defines a waist region in which cross-sectional area of said beam is at a minimum, and said blocking member is positioned directly at said waist region such that an amount of beam penetrating motion by said blocking member to produce a given attenuation range is substantially minimized.

5. The attenuator of claim 1 wherein said focused optical beam defines a waist region in which cross-sectional area of said beam is at a minimum, and said blocking member is axially offset from said waist towards one of said focusing elements.

6. The attenuator of claim 1 wherein said blocking member is coupled to a micro-mechanical actuator that moves said blocking member responsive to an attenuation control signal.

7. The attenuator of claim 6 wherein said micro-mechanical actuator comprises a silicon chip that moves said blocking member using electrostatic forces.

8. The attenuator of claim 1 wherein motion of said blocking member from a point outside the optical path of said focused beam corresponding to a minimum attenuation position, to a point of substantially complete penetration of said focused beam corresponding to a maximum attenuation position, is about 20–30 cm.

9. The attenuator of claim 1 wherein said light blocking member is selected from the group consisting of a neutral density filter, a dielectric stack, a reflective element, and combinations thereof.

10. The attenuator of claim 1 wherein each of said first and second optical transmission media is one of an optical fiber and an optical waveguide.

11. The attenuator of claim 1, further comprising at least one additional movable light blocking member for attenuating a portion of said focused light beam.

12. The attenuator of claim 1 wherein said light blocking member includes a notch in a portion thereof for reducing polarization dependent loss of said attenuator.

13. The attenuator of claim 1 wherein said light blocking member has an aperture in a portion thereof for reducing polarization dependent loss of said attenuator.

14. A fiber optic data transmission system comprising:
    a variable optical attenuator for selectively attenuating an optical signal transmitted on an optical transmission medium of said system, said attenuator including:
    a first focusing element for receiving a light beam originating from said optical transmission medium and focusing said light beam in a non-collimated manner so as to produce an inverted beam within said attenuator;
    a second focusing element opposing said first focusing element and operative to substantially focus said inverted beam upon an output optical transmission medium; and
    a movable light blocking member disposed in between said first and second focusing elements and capable of moving along at least two directional axes for selectively attenuate said light beam as a function of position of said blocking member relative to said focused light beam.

15. The data transmission system of claim 14 wherein said blocking member is coupled to a micro-mechanical actuator that moves said blocking member responsive to an attenuation control signal.

16. The data transmission system of claim 15 wherein said micro-mechanical actuator comprises a silicon chip that moves said blocking member using electrostatic forces.

17. The data transmission system of claim 14 wherein motion of said blocking member from a point outside the optical path of said focused beam corresponding to a minimum attenuation position, to a point of substantially complete penetration of said focused beam corresponding to a maximum attenuation position, is about 20–30 $\mu$m.

18. A variable optical attenuator, comprising:
    first focusing means for receiving a light beam originating from an input optical transmission medium and focusing said light beam in a non-collimated manner so as to produces an inverted beam within said attenuator;
    second focusing means opposite said first focusing, means, for substantially focusing said inverted beam upon an output optical transmission medium; and
    light blocking means disposed in between said first and second focusing elements and capable of moving along at least two directional axes for selectively attenuating said light beam as a function of position of said blocking means relative to said focused light beam.

19. The attenuator of claim 18 wherein said blocking means is coupled to a micro-mechanical actuation means that moves said blocking means responsive to an attenuation control signal.

20. The attenuator of claim 18 wherein said light blocking means includes means for reducing polarization dependent loss of said attenuator.

* * * * *